US011901143B2

(12) United States Patent
Yakeley

(10) Patent No.: US 11,901,143 B2
(45) Date of Patent: Feb. 13, 2024

(54) MAGNETIC SWITCH ARRANGEMENT

(71) Applicant: Baker Hughes Oilfield Operations LLC, Houston, TX (US)

(72) Inventor: Sean Yakeley, Houston, TX (US)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 0 days.

(21) Appl. No.: 18/180,505

(22) Filed: Mar. 8, 2023

(65) Prior Publication Data

US 2023/0230787 A1 Jul. 20, 2023

Related U.S. Application Data

(62) Division of application No. 17/579,010, filed on Jan. 19, 2022, now abandoned.

(51) Int. Cl.
*H01H 36/00* (2006.01)
*H01H 50/54* (2006.01)
*H01H 50/32* (2006.01)

(52) U.S. Cl.
CPC ........ *H01H 36/0073* (2013.01); *H01H 50/32* (2013.01); *H01H 50/54* (2013.01)

(58) Field of Classification Search
CPC ..... H01H 36/0073; H01H 50/32; H01H 50/54
See application file for complete search history.

(56) References Cited

U.S. PATENT DOCUMENTS 4,057,773 A * 11/1977 Cohen .................... H01H 36/00 335/205
4,152,755 A * 5/1979 Trosper ............... F21V 23/0414 362/208

(Continued)

FOREIGN PATENT DOCUMENTS

CN 200950420 Y 9/2007
CN 203573851 U 4/2014

(Continued)

OTHER PUBLICATIONS

Notification of Transmittal of the International Search Report and the Written Opinion of the International Searching Authority, or the Declaration; PCT/US2023/011107; dated May 4, 2023; 16 pages.

(Continued)

*Primary Examiner* — Bernard Rojas
(74) *Attorney, Agent, or Firm* — CANTOR COLBURN LLP

(57) ABSTRACT

A magnetic switching arrangement including a first contact, a second contact, at least one of the first and second contacts including a magnetically responsive material, a biaser operably connected to one of the first and second contacts and biasing the one of the first and second contact into electrical connection with the other of the first and second contacts such that a closed circuit is achieved in the absence of an external force preventing closure of the first and second contacts, and a disconnector maintaining the first and second contacts spaced from one another, preventing formation of a circuit. A method for operating a tool including applying or removing a magnetic field configuration and causing a first and second contact within the tool to make electrical contact. A borehole system including a borehole in a subsurface formation, and disposed in the borehole.

8 Claims, 8 Drawing Sheets

Manufactured State (Disabled Electronics)

(56) References Cited

U.S. PATENT DOCUMENTS

| | | | |
|---|---|---|---|
| 4,219,773 | A | 8/1980 | Markfelt |
| 4,317,969 | A | 3/1982 | Riegler et al. |
| 4,489,297 | A | 12/1984 | Haydon |
| 4,928,520 | A | 5/1990 | Barrington |
| 5,568,113 | A | 10/1996 | Chen |
| 7,278,965 | B2 | 10/2007 | Shimizu |
| 8,164,875 | B1 | 4/2012 | Ledbetter et al. |
| 2006/0114086 | A1 | 6/2006 | Grigorov |
| 2007/0035369 | A1 * | 2/2007 | Habboosh .......... H01H 36/0046 335/205 |
| 2009/0230335 | A1 | 9/2009 | Ocalan et al. |

FOREIGN PATENT DOCUMENTS

| | | | |
|---|---|---|---|
| CN | 103794408 | A | 5/2014 |
| CN | 205508711 | U | 8/2016 |
| WO | 9701018 | A2 | 1/1997 |

OTHER PUBLICATIONS

Mulder, et al., "A Fast Operating Magnetically Controlled Switch for 1 kA," IEEE Transactions on Magnetics, vol. MAG-21, No. 2, Mar. 1985; 4 pages.

* cited by examiner

Activation Mode (Powered Electronics)

Ready to Run Mode (Powered Electronics)

MAGNETIC SWITCH ARRANGEMENT

CROSS REFERENCE TO RELATED APPLICATIONS

This application is a divisional application of and claims the benefit of an earlier filing date from U.S. Non-Provisional application Ser. No. 17/579,010 filed Jan. 19, 2022, the entire disclosure of which is incorporated herein by reference.

BACKGROUND

There are situations particularly in the downhole environment but not limited thereto where electric devices are made part of a tool or operation and require power. Opening such devices after the original factory seal to connect a power source to an electrical component leaves potential for environmental leaks that may be damaging to the electrical devices. Sealing them at the factory with power connected means the devices will have a more limited useful life since power from a battery will bleed over time. The arts use both of these methods depending upon which detractor is more tolerable for a particular operation. The arts would well receive alternative solutions that do not suffer the drawbacks noted.

SUMMARY

An embodiment of a magnetic switching arrangement including a first contact, a second contact, at least one of the first and second contacts including a magnetically responsive material, a biaser operably connected to one of the first and second contacts and biasing the one of the first and second contact into electrical connection with the other of the first and second contacts such that a closed circuit is achieved in the absence of an external force preventing closure of the first and second contacts, and a disconnector maintaining the first and second contacts spaced from one another, preventing formation of a circuit.

An embodiment of a magnetic switching arrangement, including a first contact, a second contact, at least one of the first and second contacts including a magnetic field emanating therefrom, a biaser operably connected to one of the first and second contacts and biasing the one of the first and second contact out of electrical connection with the other of the first and second contacts such that a closed circuit is achieved in the presence of an external force causing closure of the first and second contacts, and a magnetic field configuration positionable to interact with the magnetic field emanating from the at least one of the first and second contacts, the magnetic field configuration supplying the external force.

An embodiment of a method for operating a tool including applying or removing a magnetic field configuration to an outside surface of the tool, causing a first and second contact within the tool to make electrical contact by the applying or removing of the magnetic field configuration.

An embodiment of a borehole system including a borehole in a subsurface formation, and an arrangement disposed in the borehole.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
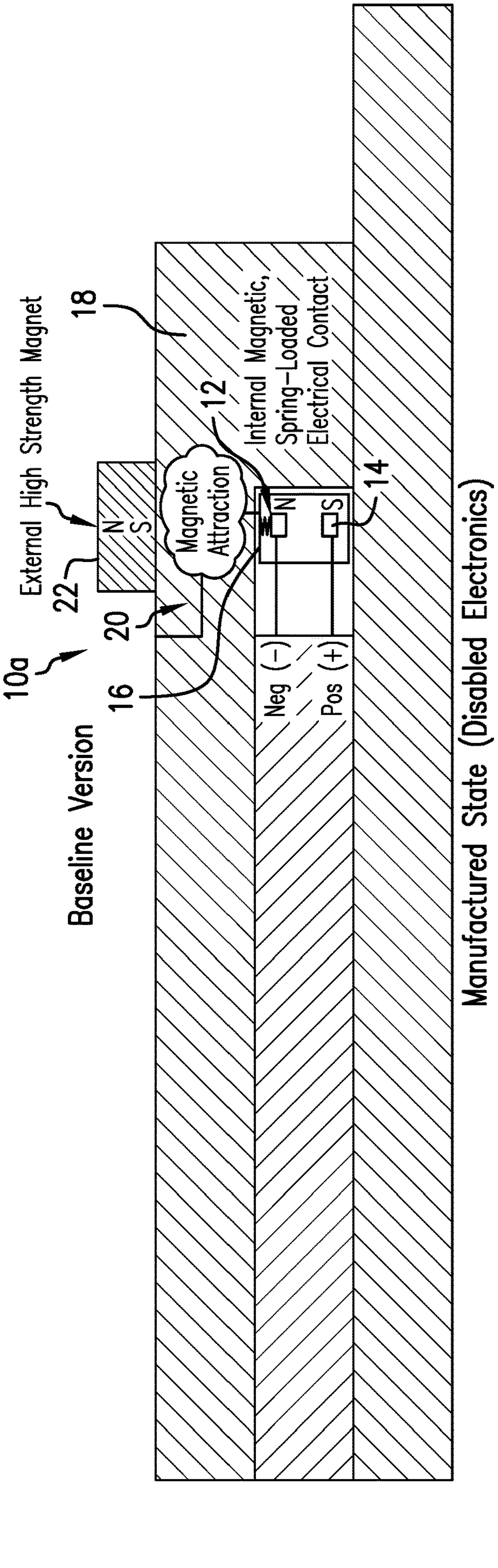
FIG. 1 is a schematic view of a magnetic switching arrangement as disclosed herein in a first position.
Figure 2:
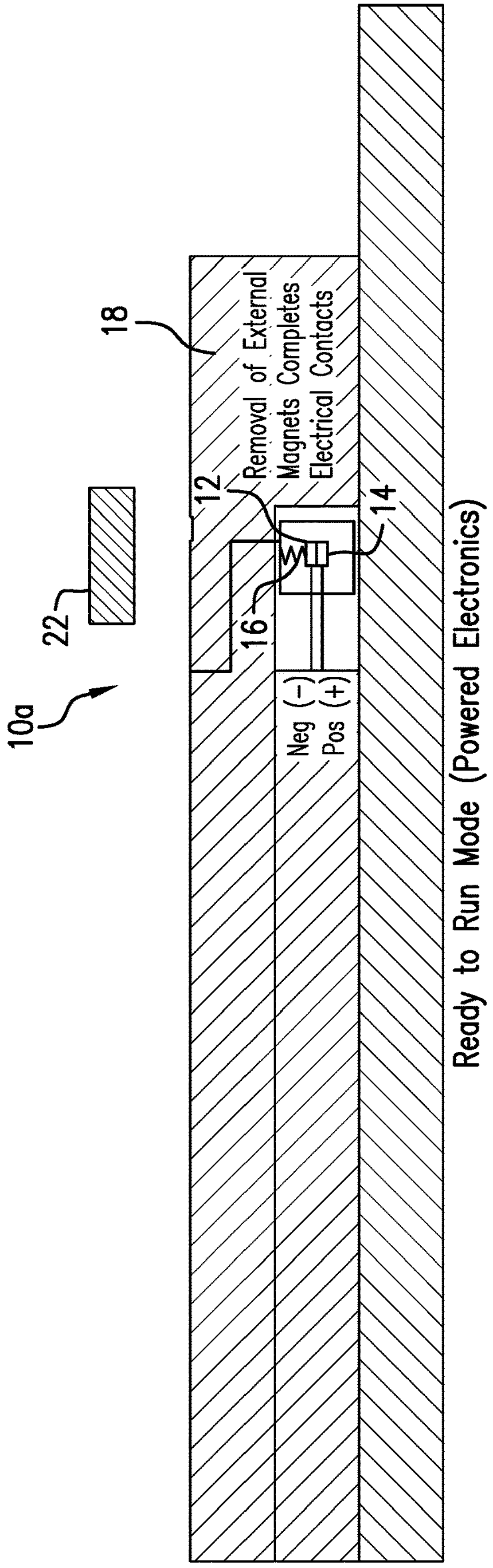
FIG. 2 is the magnetic switching arrangement of FIG. 1 in a second position.

Referring to FIGS. 1 and 2, a magnetic switching arrangement **10*a* is illustrated. Arrangement 10*a* comprises a first contact 12, and a second contact 14. At least one of the first and second contacts includes a material that is responsive to an applied magnetic field. The magnetically responsive material may make up a part of or the whole of the contact. In one variant, for example, contact 12 includes the magnetically responsive material. Magnetically responsive material may be a ferrous metal or may be a magnetized material whether that be a permanent magnetization or an electromagnitization. A biaser 16 is operably connected to one of the first and second contacts 12, 14 and biases the one of the first and second contacts into electrical connection with the other of the first and second contacts such that a closed circuit is achieved in the absence of an external force preventing closure of the first and second contacts. In the embodiment of FIGS. 1 and 2, the biaser is disposed between a housing 18 and the contact 12. The biaser 16 is configured to urge the contact 12 toward the contact 14 to thereby make an electrical connection between contacts 12 and 14. As illustrated in FIG. 1 however, the impetus provided by biaser 16 is not able to cause the connection to be made between contacts 12 and 14 because a disconnector 20 inhibits that connection. The disconnector 20 in FIG. 1 is a magnetic field coming from magnet 22, that may be a permanent magnet or an electromagnet. In the embodiment of FIG. 1, the contact 12 is to be attracted to magnet 22 and hence polarity should be arrangement to meet that intent. Magnet 22 when in the position of FIG. 1 prevents electrical contact between contacts 12 and 14 while the magnet 22 in the position of FIG. 2 fails to prevent electrical contact. Stated differently, the magnet 22 in the position illustrated in FIG. 1 maintains the first and second contacts 12, 14 spaced from one another, overcoming the bias of the biaser 16 and preventing formation of a circuit. When magnet 22 is removed to a distance from the contacts 12 and 14 sufficient to decay the magnetic field from magnet 22 reaching the contact 12, the biaser 16 will become the dominant force and cause electrical connection between contact 12 and contact 14. The arrangement 10*a* may be configured at the factory with a power source electrically isolated and then effectively switched to turn that power on in the field without any disassembly of the arrangement 10*a*. In an embodiment, the magnet 22 may be adhered to the housing 18, it may be threaded and screwed into the housing 18, may be coupled to housing 18 with a strap, etc. Overall, the magnet 22 is to remain in the position illustrated in FIG. 1 until the arrangement 10***a* is to be activated, whereupon the magnet 22 is removed and power switched on.

Figure 3:
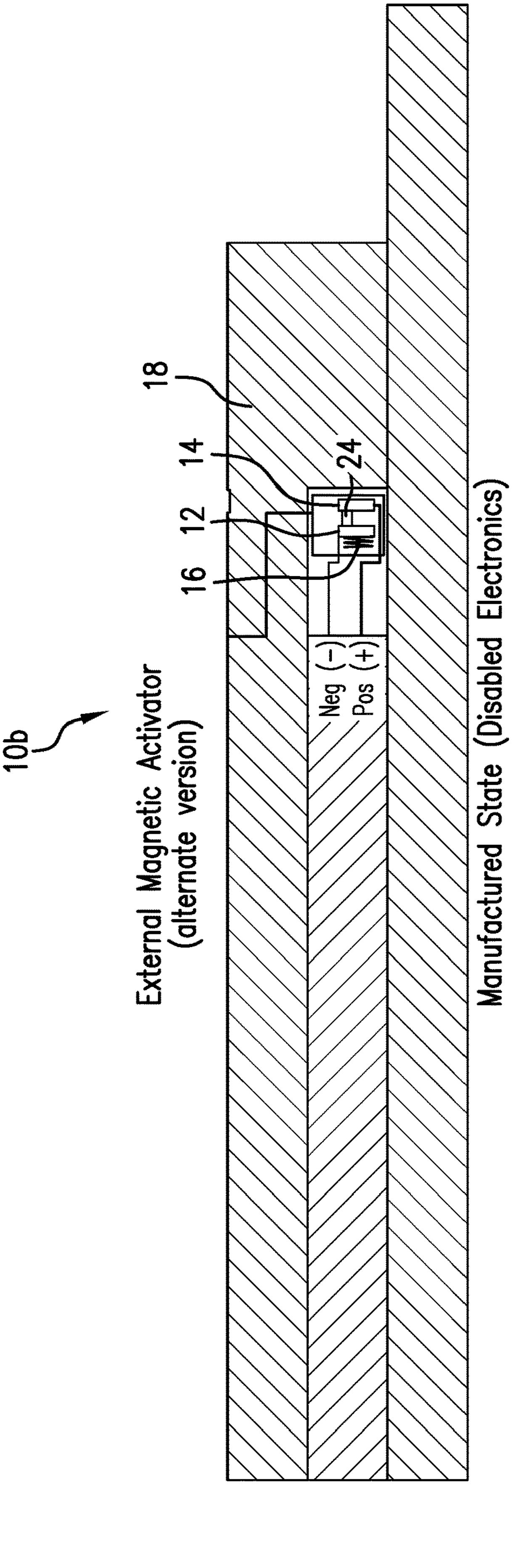
FIG. 3 is a schematic view of an alternate magnetic switching arrangement as disclosed herein in a first position.
Figure 4:
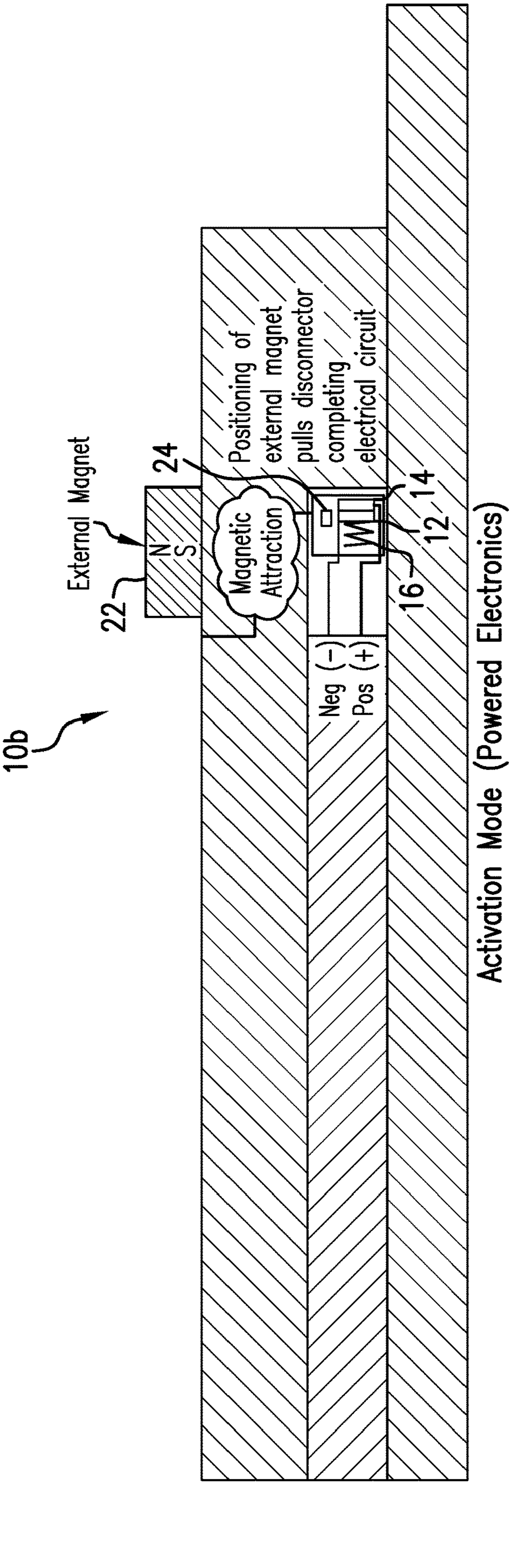
FIG. 4 is the magnetic switching arrangement of FIG. 3 in a second position.
Figure 5:
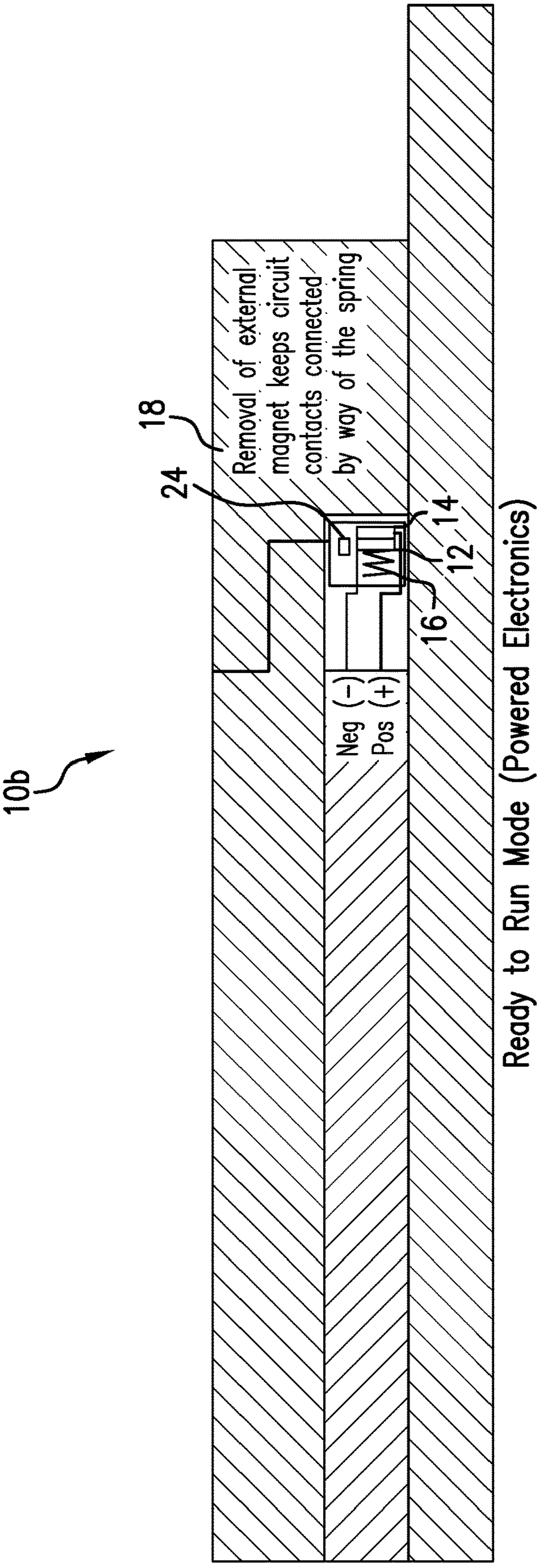
FIG. 5 is the magnetic switching arrangement of FIG. 3 with the magnet removed.

In another embodiment, referring to FIG. 3-5, contacts 12 and 14 are still biased toward making an electrical connection but a disconnector 24 is disposed therebetween. The disconnector 24 may be a component such as a block of material that includes a magnetically responsive material such as a ferrous metal or in fact a magnetized material. The disconnector 24 is not conductive from one end to its other end since it is meant to prevent electrical connection between contacts 12 and 14. Disconnector 24 may therefore include an electrically nonconducting portion therein at an end, or between the ends or may be entirely electrically nonconducting or may be coated in electrically nonconducting material like plastic, etc. The arrangement 10*b*, remains in a power off position since the contacts 12 and 14 may not make electrical contact until the disconnector 24 is physically removed and thereby the impediment to the contacts 12 and 14 moving into electrical contact under the force of the biaser 16 is eliminated. Disconnector 24 may be placed between the contacts 12 and 14 or alongside contacts 12 or 14 so long as it prevents the contacts making an electrical circuit therebetween. Then upon removal of the disconnector 24 to a position where it no longer presents an impediment to the electrical connection of the counts 12 and 14, the electrical connection is made. Removal of the disconnector 24 occurs in this embodiment when magnet 22 is brought into sufficient proximity to the disconnector 24 that the magnetic field of the magnet 22 interacts with the disconnector 24 and moves it either attractively or repulsively to a position where disconnector 24 is no longer and impediment to contacts 12 and 14 making electrical contact. This can be appreciated in both FIGS. 4 and 5 with FIG. 5 showing that once the disconnecter 24 is removed from its position as an impediment, it does not thereafter regain that position.

Figure 6:
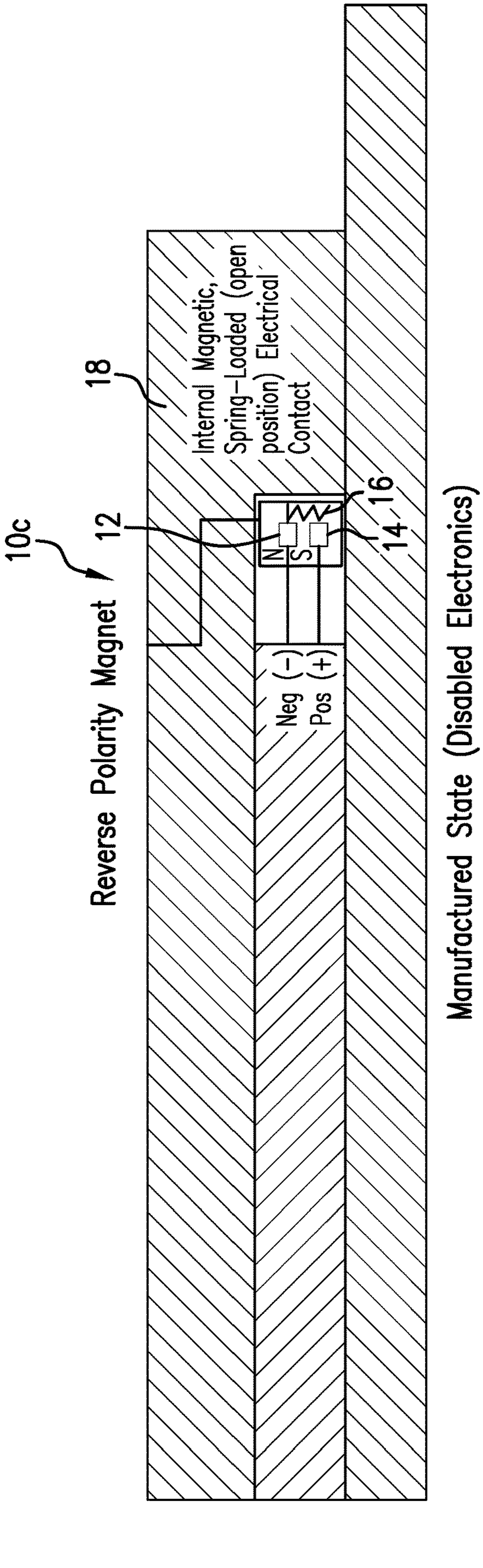
FIG. 6 is a schematic view of another alternate magnetic switching arrangement as disclosed herein in a first position.
Figure 7:
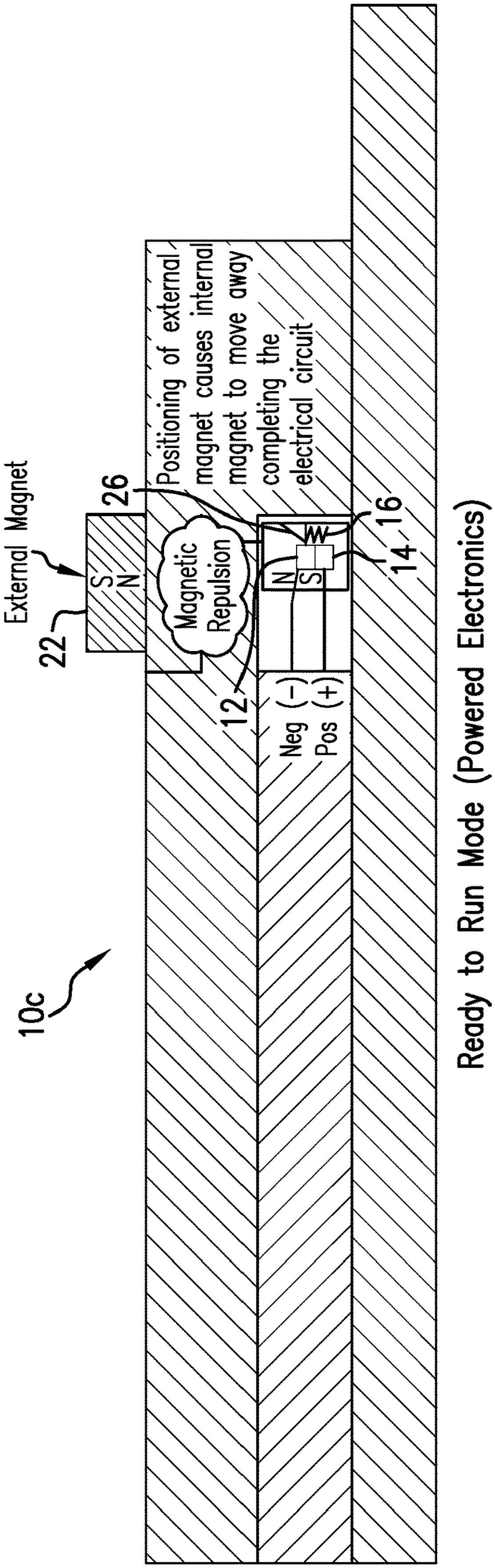
FIG. 7 is the magnetic switching arrangement of FIG. 6 in a second position.

Referring to FIGS. 6 and 7, yet another embodiment of the arrangement, arrangement 10*c*, is illustrated. In the embodiment of FIGS. 6 and 7, a repulsive force of magnet 22 is used against contact 12 which is itself magnetic and is of a reverse polarity to that of magnet 22. Accordingly, when magnet 22 is brought into magnetic field proximity to the contact 12, the contact 12 is repelled from magnet 22. The repulsive force of magnet 22 is greater than the counter force of biaser 16, which in this embodiment is positioned to force the contacts 12 and 14 apart, so that with the magnet 22 in the position shown in FIG. 7, electrical contact is made. The magnet 22 will remain with the arrangement 10*b* until and unless it is desired that the circuit be broken. Accordingly, the magnet 22 may be retained in the housing 18 by thread, straps, glue, etc. as desired. Like the foregoing embodiments, the embodiment of arrangement 10*c* allows for the connection of power without any disassembly of the arrangement. Alternatively, it is also contemplated to fit the arrangement 10*c* with a pawl 26 (could be on contact 12 or on the biaser 16, so long as it allows movement into electrical contact and prevents movement back out of electrical contact) so that the contact 12 once moved by magnet 22 cannot retract under the force of biaser 16.

Figure 8:
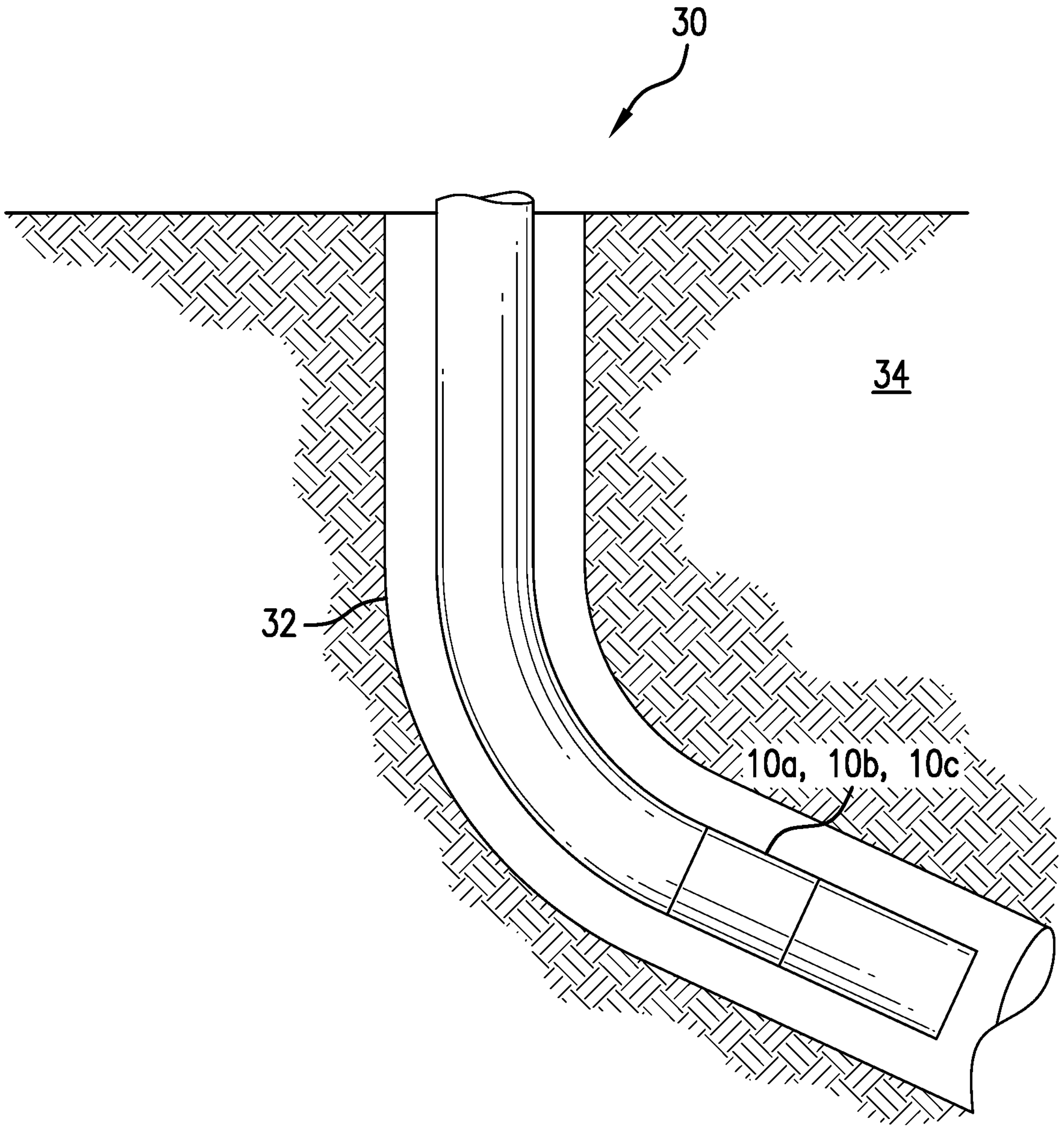
FIG. 8 is a view of a borehole system including the magnetic switching arrangement disclosed herein.

Referring to FIG. 8, a borehole system 30 is illustrated. The system 30 includes a borehole 32 in a subsurface formation 34. The system 30 further includes one or more of the arrangements 10*a*,10*b*,10*c* within the borehole 32.

Set forth below are some embodiments of the foregoing disclosure:

Embodiment 1: A magnetic switching arrangement including a first contact, a second contact, at least one of the first and second contacts including a magnetically responsive material, a biaser operably connected to one of the first and second contacts and biasing the one of the first and second contact into electrical connection with the other of the first and second contacts such that a closed circuit is achieved in the absence of an external force preventing closure of the first and second contacts, and a disconnector maintaining the first and second contacts spaced from one another, preventing formation of a circuit.

Embodiment 2: The arrangement as in any prior embodiment wherein the disconnector is a magnetic field.

Embodiment 3: The arrangement as in any prior embodiment wherein the disconnector is a blocking configuration.

Embodiment 4: The arrangement as in any prior embodiment wherein the blocking configuration is movable.

Embodiment 5: The arrangement as in any prior embodiment wherein the blocking configuration is responsive to application of a magnetic field to move the blocking configuration to a defeated position.

Embodiment 6: The arrangement as in any prior embodiment wherein the disconnector is a permanent magnet whose magnetic field is removable from the arrangement.

Embodiment 7: The arrangement as in any prior embodiment wherein one or more of the first and second contacts is a magnet.

Embodiment 8: The arrangement as in any prior embodiment wherein the magnet is a permanent magnet.

Embodiment 9: The arrangement as in any prior embodiment wherein the biaser includes a spring.

Embodiment 10: The arrangement as in any prior embodiment wherein the biaser further includes a locking mechanism that locks the first and second contacts in electrical contact following defeat of the disconnector.

Embodiment 11: The arrangement as in any prior embodiment wherein the locking mechanism includes a pawl.

Embodiment 12: A magnetic switching arrangement, including a first contact, a second contact, at least one of the first and second contacts including a magnetic field emanating therefrom, a biaser operably connected to one of the first and second contacts and biasing the one of the first and second contact out of electrical connection with the other of the first and second contacts such that a closed circuit is achieved in the presence of an external force causing closure of the first and second contacts, and a magnetic field configuration positionable to interact with the magnetic field emanating from the at least one of the first and second contacts, the magnetic field configuration supplying the external force.

Embodiment 13: The arrangement as in any prior embodiment wherein the biaser is a spring.

Embodiment 14: The arrangement as in any prior embodiment wherein the magnetic field of the at least one of the first and second contacts is of opposing polarity from the magnetic field of the magnetic field configuration.

Embodiment 15: The arrangement as in any prior embodiment further including a locking mechanism that locks the first and second contacts in electrical contact with one another following positioning of the magnetic field configuration in magnetic field communication with the magnetic field of the at least one of the first and second contacts.

Embodiment 16: The arrangement as in any prior embodiment wherein the locking mechanism includes a pawl.

Embodiment 17: A method for operating a tool including applying or removing a magnetic field configuration to an outside surface of the tool, causing a first and second contact within the tool to make electrical contact by the applying or removing of the magnetic field configuration.

Embodiment 18: The method as in any prior embodiment wherein the causing is by removing a physical impediment to electrical connection.

Embodiment 19: The method as in any prior embodiment wherein the causing is by opposing with the magnetic field configuration a polarity of one of the first and second contacts, wherein one of the first and second contacts comprises a magnetic field.

Embodiment 20: A borehole system including a borehole in a subsurface formation, and an arrangement as in any prior embodiment disposed in the borehole.

The use of the terms "a" and "an" and "the" and similar referents in the context of describing the invention (especially in the context of the following claims) are to be construed to cover both the singular and the plural, unless otherwise indicated herein or clearly contradicted by context. Further, it should be noted that the terms "first," "second," and the like herein do not denote any order, quantity, or importance, but rather are used to distinguish one element from another. The terms "about", "substantially" and "generally" are intended to include the degree of error associated with measurement of the particular quantity based upon the equipment available at the time of filing the application. For example, "about" and/or "substantially" and/or "generally" can include a range of ±8% or 5%, or 2% of a given value.

The teachings of the present disclosure may be used in a variety of well operations. These operations may involve using one or more treatment agents to treat a formation, the fluids resident in a formation, a borehole, and/or equipment in the borehole, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A magnetic switching arrangement, comprising:

a first contact;

a second contact, at least one of the first and second contacts including a magnetic field emanating therefrom;

a biaser operably connected to one of the first and second contacts and biasing the one of the first and second contact out of electrical connection with the other of the first and second contacts such that a closed circuit is achieved in the presence of an external force causing closure of the first and second contacts;

a magnetic field configuration positionable to interact with the magnetic field emanating from the at least one of the first and second contacts, the magnetic field configuration supplying the external force, and further including a locking mechanism that locks the first and second contacts in electrical contact with one another following positioning of the magnetic field configuration in magnetic field communication with the magnetic field of the at least one of the first sand second contacts.

2. The arrangement as claimed in claim 1 wherein the biaser is a spring.

3. The arrangement as claimed in claim 1 wherein the magnetic field of the at least one of the first and second contacts is of opposing polarity from the magnetic field of the magnetic field configuration.

4. The arrangement as claimed in claim 1 wherein the locking mechanism includes a pawl.

5. A borehole system comprising:

a borehole in a subsurface formation; and an arrangement as claimed in claim 1 disposed in the borehole.

6. A method for operating a tool comprising:

applying a magnetic field configuration to an outside surface of the tool;

biasing one of a first and second contact out of electrical connection with the other of the first and second contact;

causing the first and second contact within the tool to make electrical contact by the applying of the magnetic field configuration; and locking the first and second contacts in electrical contact with one another.

7. The method as claimed in claim 6 wherein the causing is by removing a physical impediment to electrical connection.

8. The method as claimed in claim 6 wherein the causing is by opposing with the magnetic field configuration a polarity of one of the first and second contacts, wherein one of the first and second contacts comprises a magnetic field.

* * * * *